(12) United States Patent
Hughes et al.

(10) Patent No.: US 12,010,641 B2
(45) Date of Patent: Jun. 11, 2024

(54) WIRELESS MESH NETWORK AND METHOD OF RELAYING SIGNAL IN WIRELESS MESH NETWORK

(71) Applicant: KATHOLIEKE UNIVERSITEIT LEUVEN, Leuven (BE)

(72) Inventors: Danny Hughes, Heverlee (BE); Sam Michiels, Aarschot (BE); Jonathan Oostvogels, Schoten (BE); Fan Yang, Heverlee (BE)

(73) Assignee: Katholieke Universiteit Leuven, Leuven (BE)

( * ) Notice: Subject to any disclaimer, the term of this patent is extended or adjusted under 35 U.S.C. 154(b) by 77 days.

(21) Appl. No.: 17/906,846

(22) PCT Filed: Mar. 19, 2021

(86) PCT No.: PCT/EP2021/057052
§ 371 (c)(1),
(2) Date: Sep. 20, 2022

(87) PCT Pub. No.: WO2021/186016
PCT Pub. Date: Sep. 23, 2021

(65) Prior Publication Data
US 2023/0128409 A1    Apr. 27, 2023

(30) Foreign Application Priority Data

Mar. 20, 2020  (EP) .................................... 20164642
Jul. 10, 2020   (EP) .................................... 20185143

(51) Int. Cl.
*H04W 56/00*   (2009.01)
*H04B 10/11*   (2013.01)
*H04W 84/18*   (2009.01)

(52) U.S. Cl.
CPC ........ *H04W 56/0045* (2013.01); *H04B 10/11* (2013.01); *H04W 56/0015* (2013.01); *H04W 84/18* (2013.01)

(58) Field of Classification Search
CPC .............. H04B 10/11; H04W 56/0045; H04W 56/0015; H04W 84/18
(Continued)

(56) References Cited

U.S. PATENT DOCUMENTS 5,088,091 A        2/1992  Schroeder et al.
11,140,695 B1 *  10/2021  Eyuboglu ........... H04W 72/535
(Continued)

OTHER PUBLICATIONS

International Preliminary Report on Patentability issued in International Application No. PCT/EP2021/057052, dated Sep. 20, 2022.
(Continued)

*Primary Examiner* — Dalzid E Singh
(74) *Attorney, Agent, or Firm* — Knobbe, Martens, Olson & Bear, LLP

(57) ABSTRACT

A wireless mesh network of nodes includes at least one relay node, the at least one relay node being configured to receive a first signal, the first signal corresponding to a first symbol comprised in a data frame, the first symbol having a first symbol duration s; and to generate and transmit a second signal, the second signal corresponding to the first signal. The first signal and the second signal are modulated such that a sum of the first signal and the second signal is capable of being received and demodulated by at least one relay node so as to obtain a sum of symbols including the first symbol and the second symbol.

15 Claims, 7 Drawing Sheets

(58) Field of Classification Search
USPC .......................................................... 398/118
See application file for complete search history.

(56) References Cited

U.S. PATENT DOCUMENTS

| | | | | |
|---|---|---|---|---|
| 11,251,933 | B2* | 2/2022 | Garcia-Luna-Aceves | ................... H04L 5/0044 |
| 2005/0014464 | A1* | 1/2005 | Larsson | ................ H04L 5/0048 455/11.1 |
| 2016/0269202 | A1* | 9/2016 | Hsu | ................... H04B 7/15507 |
| 2020/0383047 | A1* | 12/2020 | Sun | ................... H04W 52/0203 |
| 2021/0226690 | A1* | 7/2021 | Lin | ................... H04B 7/15578 |

OTHER PUBLICATIONS

Syed Ali Jafar et al., "Duality and Rate Optimization for Multiple Access and Broadcast Channels With Amplify-and-Forward Relays", IEEE Transactions on Information Theory, IEEE Press, USA, vol. 51, No. 10, Oct. 1, 2007.

Chang Wook Ahn et al., "Wireless cooperative communication", Ubiquitous Information Management and Communication, ACM, 2 Penn Plaza, Suite 701 New York NY 10121-0701 USA, Feb. 21, 2011.

Briscoe Bob et al, "Reducing Internet Latency: A Survey of Techniques and Their Merits", IEEE Communications Surveys & Tutorials, vol. 18, No. 3, Nov. 26, 2014.

Zhang Xinyu et al., "Cooperation without Synchronization: Practical Cooperative Relaying for Wireless Networks", IEEE Transactions on Mobile Computing, IEEE Service Center, Los Alamitos, CA, US, vol. 14, No. 5, May 1, 2015.

Xinyu Zhang et al., "DAC: Distributed Asynchronous Cooperation for Wireless Relay Networks", A Infocom, 2010 Proceedings IEEE, IEEE, Piscataway, NJ, USA, Mar. 14, 2010.

International Search Report and Written Opinion issued in application No. PCT/EP2021/057052, dated Aug. 25, 2021.

\* cited by examiner

WIRELESS MESH NETWORK AND METHOD OF RELAYING SIGNAL IN WIRELESS MESH NETWORK

TECHNICAL FIELD

The invention relates to wireless mesh networks and methods of relaying signals in a wireless mesh network.

BACKGROUND

The Internet of Things depends strongly on unlicensed radio spectrum for connecting sensors, actuators, and other objects to their environment. Although technologies such as IEEE 802.15.4 and Bluetooth Low Energy are capable of providing short-range radio links to address the need for embedded wireless connectivity, using radio as a communication medium comes with significant challenges: unlicensed spectrum is scarce, crowded, and unreliable.

One method which addresses the reliability problem is time division multiple access (TDMA) in combination with frequency hopping and store-and-forward routing, which enables scalable low-power wireless mesh networks that can achieve wire-like end-to-end reliability as described in D. Dujovne et al., 6TiSCH: deterministic IP-enabled industrial internet (of things). IEEE Communications Magazine 52, 12 (December 2014), 36-41. However, the performance of such networks is well below that of their wired counterparts, with end-to-end latencies and jitter of the order of seconds. Furthermore, the need for medium access control (MAC) and routing in multi-hop networks results in drastic channel underutilisation.

Existing wireless networks cannot compete with the feature set provided by industrial wired control in dense or latency-sensitive settings: they cannot provide deterministic sub-millisecond latencies, sustained throughput for arbitrary traffic flows or priority-based contention resolution without collisions.

A technique called cut-through relaying is used in wireless and wired networks, for example in Zhang Xinyu et al. "Cooperation without synchronization: Practical cooperative relaying for wireless networks", IEEE Transactions on Mobile Computing, 14 (2015) 937-950; Xinyu Zhang et al. "DAC: Distributed asynchronous cooperation for wireless relay networks", Infocom, 2010 Proceedings IEEE (2010) 1-9; U.S. Pat. No. 5,088,091 A; and Briscoe Bob et al. "Reducing internet latency: A survey of techniques and their merits". However, this technique still requires the complete reception of specific metadata (such as the packet header) before relaying can commence.

Therefore, there is still a need for methods of implementing highly reliable, low latency, high throughput wireless connectivity with wire-like performance.

SUMMARY

According to a first aspect of the present invention there is provided a wireless mesh network of nodes comprising at least one relay node, wherein the at least one relay node is configured to receive a first signal, the first signal corresponding to a first symbol comprised in a data frame, the first symbol having a first symbol duration s; and to generate and transmit a second signal, the second signal corresponding to the first signal; wherein the first signal and the second signal are modulated such that a sum of the first signal and the second signal is capable of being received and demodulated by at least one relay node so as to obtain a sum of symbols including the first symbol and the second symbol; wherein a time offset r between the start time of the transmission of the second signal by the relay node and the time at which the first signal was received by the relay node is smaller than the first symbol duration s; and wherein the time offset r is chosen such that any pair of corresponding signals has a time offset q from the perspective of any relay node in the network, where q is less than s.

In an alternative first aspect of the present invention there is provided a wireless mesh network of nodes comprising at least one relay node, wherein the at least one relay node is configured to receive a first signal modulated on an incoherent wave, the first signal corresponding to a first symbol comprised in a data frame, the first symbol having a first symbol duration s; and to generate and transmit a second signal modulated on an incoherent wave, the second signal corresponding to the first signal; wherein a time offset r between the start time of the transmission of the second signal by the relay node and the time at which the first signal was received by the relay node is smaller than the first symbol duration s; and wherein the time offset r is chosen such that any pair of corresponding signals has a time offset q from the perspective of any relay node in the network, where q is less than s.

The first signal corresponds to the first symbol comprised in a data frame. The second signal corresponds to the first signal. The second symbol therefore corresponds to the first symbol in the second signal; the term "first" is herein used both in the chronological sense as well as in the sense that it corresponds to the first symbol in the first signal.

It is an advantage of embodiments of the present invention that, by relaying a symbol before the completion of the transmission of the symbol, a wire-like bus can be provided in a wireless network. Advantageously, embodiments of the present invention allow for end-to-end multihop communication at lower latencies and jitter than conventional mesh networks, which rely on store-and-forward routing.

The first and second signals may be modulated on respective incoherent waves. The first and second signals may be modulated on a (series of) pulses.

The at least one relay node may be configured, upon receiving a subsequent third signal, to relay the third signal only if the third signal is received at a time offset relative to the time of receiving the first signal which is greater than or equal to the first symbol duration s.

It is an advantage of embodiments of the present invention that a node can avoid re-relaying a signal that it has already relayed. Advantageously, embodiments of the present invention allow for communication of symbol sequences of arbitrary length without requiring explicit coordination across nodes at the time of deployment or transmission.

The nodes may be configured to communicate by optical wireless communication.

It is an advantage of embodiments of the present invention that a wireless communication network can be established within an existing lighting setup. It is also an advantage of embodiments of the present invention that nodes can participate in or make use of the network using low-cost off-the-shelf components such as LEDs.

The wireless network may comprise one or more send nodes which are configured to transmit data to other nodes in the wireless network and are configured to decide whether to transmit data and which data to transmit. A send node may be a node which is fixed in a send mode, or may be a node which is configured to change from a send mode to another type of mode, such as a relay mode in which the node behaves as a relay node, in specified circumstances.

It is an advantage of embodiments of the present invention that the number, density and coverage area of nodes in particular modes can be adjusted to optimise network characteristics, such as network reliability, in dependence on application requirements.

A relay node and optionally a send node may be configured to transmit signals using on-off keying.

It is an advantage of embodiments of the present invention that nodes can send data through the network using general-purpose output mechanisms, such as by toggling a digital pin, without requiring custom driver circuits for their emitters. It is also an advantage that certain symbols can be made to dominate others in case of concurrent transmissions by different nodes: the network as a whole can be interpreted to transmit an "on" symbol when at least one node transmits an "on" symbol", whereas an "off" symbol requires all nodes to be off, or vice versa.

A relay node and optionally a send node may be configured to transmit signals using a self-clocking code.

It is an advantage of embodiments of the present invention that nodes can continue to comply with the constraints regarding the time offsets of corresponding signals in the presence of clock drift and without explicit time synchronisation or constraining the bits of information that can be transmitted through a network.

A relay node and optionally a send node may be configured to transmit signals using a run-length limited code.

It is an advantage of embodiments of the present invention that the need for a reference level for interpreting received signals can be avoided.

A relay node and optionally a send node may be configured to delineate a data frame by suppressing a clocking event in a signal encoded with a self-clocking code.

It is an advantage of embodiments of the present invention that certain conventional and often fixed-length fields in a data frame, such as those indicating frame length, preambles, frame start, or frame end can be omitted from transmission.

A relay node and optionally a send node may be configured to detect a state change in a received signal by determining whether the received signal is convex or concave.

It is an advantage of embodiments of the present invention that a signal transmitted by a send node among many slightly offset signals that correspond to the same initial signal in the presence of filters that mitigate ambient noise can be decoded by a relay node. It is also an advantage that nodes can reason on the combined signal that results from many concurrently emitted signals using a single detector.

A send node may be configured to observe signals transmitted through the network.

A send node may be configured to not interrupt an ongoing data transmission.

It is an advantage of embodiments of the present invention that it can be avoided that a higher priority signal is interrupted or corrupted by a lower priority signal.

A send node may be configured to pause, halt, or modify a transmission of data in dependence upon a signal received from another node in the network.

A send node may be configured to change its mode upon observing a signal which does not conform to a symbol transmitted by the send node.

It is an advantage of embodiments of the present invention that a send node can change to a relay mode and thus relay a received signal, for example if the received signal has a higher priority than a signal currently being transmitted by the send node.

A node in a send mode may be configured to consider a combined signal from N nodes, where N is greater than or equal to 2, in a send mode to conform to the symbols transmitted by M nodes in a send mode, where M is less than or equal to N−1.

A send node may be configured to decide on abandoning a send mode at a time offset less than t after the onset of a signal not confirming to a symbol transmitted by the send node.

It is an advantage of embodiments of the present invention that nodes can contend for the communication capabilities offered by the network without affecting performance characteristics of the network, thus guaranteeing performance levels independent of traffic flow patterns and without prior allocation of resources.

A node may be configured to prioritise signals sent by the node by prepending a sequence of symbols to data frames encoded in signals sent by the node.

It is advantage of embodiments of the present invention that, when multiple nodes contend for the communication capabilities offered by the network, a winner of the contention process can be determined without configuration prior to transmission or explicit acknowledgements by receiving nodes.

Determining whether the received signal is convex or concave may comprise comparing a difference between at least two approximations of the signal's first derivative with a noise threshold value.

A node comprised in the network may be configured to modify the noise threshold value in dependence upon a background noise level.

A node comprised in the network may be configured to modify the noise threshold value in dependence upon intensity values of valid received signals.

It is an advantage of embodiments of the present invention that a node can autonomously adapt to a changing background noise or signal strength level.

A node may be configured to consider a data frame as valid if the length of the frame occurs in a pre-determined set of data frame lengths, the pre-determined set being configured with the node before the end of the frame's reception by that node.

It is an advantage of embodiments of the present invention that frame corruption can be detected without the need for embedding error-detecting codes in a frame.

A relay node may be configured, on receiving a third signal different to the first signal while transmitting the second signal, to generate and transmit a fourth signal modulated on an incoherent wave, the fourth signal corresponding to the third signal, wherein the transmission of the fourth signal begins after end of transmission of the second signal. This allows a series of symbols to be sequentially relayed.

A relay node and optionally a send node may comprise a detector, an emitter, a processor and a transceiver, wherein the transceiver is configured to receive samples, for example intensity data of an incoherent wave, received by the detector from the detector, wherein the transceiver is configured to demodulate the received samples and to output demodulated data, wherein the transceiver is configured to receive data to be transmitted, and wherein the transceiver is configured to modulate the received data to be transmitted and provide the resulting signal to the emitter.

The detector may be configured to detect a signal, for example the intensity of an incoherent wave, and to provide samples of the signal to the transceiver. The transceiver may be configured to output the demodulated data to the processor. The processor may be configured to provide data to be transmitted to the transceiver. A relay and optionally a send node may be configured to perform the following steps:

i) at the transceiver, retrieve data from the detector indicating the intensity of an incoherent wave at a particular time step and perform an edge or pulse detection based on the received data and stored data points corresponding to earlier intensity measurements received from the detector in order to determine a received symbol;

ii) at the transceiver, determine the required state of the emitter of the relay node in dependence upon the determined received symbol and upon whether the node is acting as a send node;

iii) provide from the transceiver to the emitter a signal for setting the state of the emitter;

iv) at the transceiver, determining whether the end of a frame has been reached and, if it is determined that the end of a frame has been reached, setting the transceiver to not initiate transmissions for a predetermined period.

A relay node and optionally a send node may be configured to repeat steps i) to iv) at predetermined intervals.

It is an advantage of embodiments of the present invention that appropriate settings for r and s can be determined empirically and at deployment time for a given topology.

According to a second embodiment of the present invention there is provided a method of relaying a signal in a wireless mesh network of nodes, the method comprising the steps of: receiving, at a first node comprised in the network, a first signal modulated on an incoherent wave, the first signal corresponding to a first symbol comprised in a data frame, the first symbol having a symbol duration s; generating and transmitting, at the first node, a second signal modulated on an incoherent wave, the second signal corresponding to the first signal; wherein a time offset r between the start time of the transmission of the second signal by the relay node and the time at which the first signal was received by the relay node is smaller than the first symbol duration s; and wherein the time offset r is chosen such that any pair of corresponding signals has a time offset of q from the perspective of any relay node in the network, where q is less than s.

BRIEF DESCRIPTION OF THE DRAWINGS

Certain embodiments of the present invention will now be described, by way of example, with reference to the accompanying drawings, in which.

Figure 1:
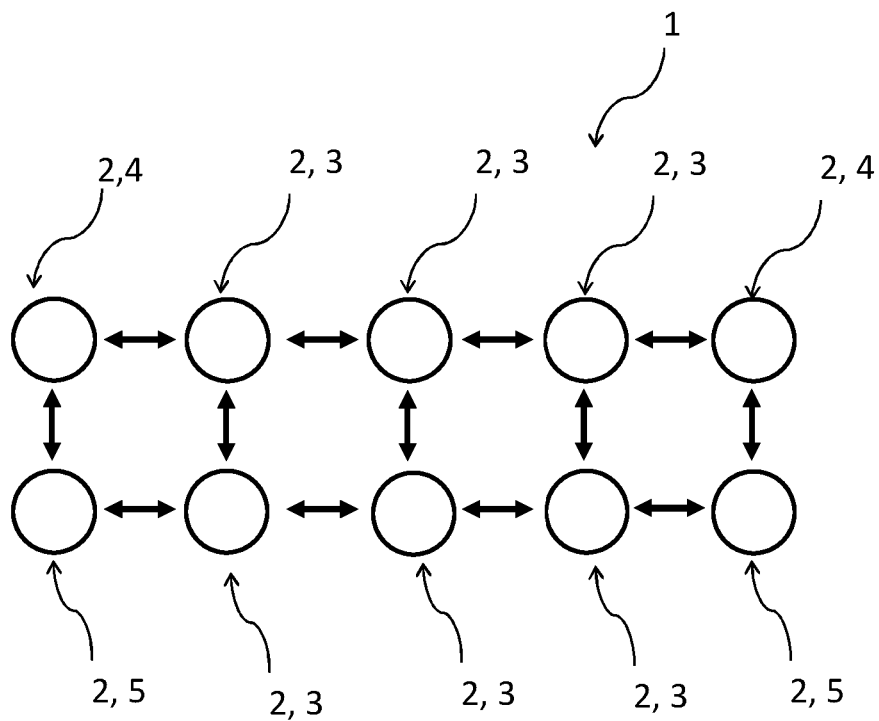
FIG. 1 is a schematic illustration of a wireless mesh network according to embodiments of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF EMBODIMENTS

Referring to FIG. 1, a wireless mesh network 1 according to embodiments of the present invention comprises a plurality of nodes 2. It will be understood that the connections between nodes 2 shown by arrows in FIG. 1 are arbitrary and that any node 2 can communicate with any other node 2 in range. The term "mesh network" is to be understood at the level of physical connectivity, that is, in terms of the connectivity graph caused by the ranges of the nodes. As a mesh network, the network 1 does not have any constraints on its structure. The network 1 may be a partially or a fully connected mesh network. The mesh network 1 may be part of or comprised in a wider network (not shown).

The plurality of nodes 2 comprises at least one relay node 3. The plurality of nodes 2 may additionally comprise at least one send node 4. The plurality of nodes 2 may additionally comprise at least one receive node 5. Signals may be sent by nodes 2 to or received by nodes 2 from sources or destinations (not shown) which are not comprised in the wireless mesh network 1.

The network 1 may be based on visual light communication (VLC), in which light is used to transmit signals encoding data. The network 1 may be based on a different wireless communication method, such as radio frequency signals, optical signals in the non-visible spectrum e.g. infrared or ultraviolet, acoustic signals which may be audible, ultrasonic, or vibrational.

In some embodiments, each node 2 has a fixed function (send, relay, receive) which does not change. In some embodiments, one or more nodes 2 are capable of switching between at least a send mode and a relay mode, and optionally also a receive mode, and may optionally choose to change their current mode to a different type of mode. A node 2 may be configured to change its mode for example due to a rearrangement of relative positions of the nodes 2; on request of an application making use of the network; as a result of a network monitoring system or a system administrator determining that the mode change would improve network performance; in dependence upon a property of an observed signal, etc. For example, a node in a send mode may decide to change to operating in a relay mode upon receiving a signal having a higher priority than a signal currently being transmitted by the node in the send mode. Mode switching can occur on relatively short timescales, such as within the timespan of a single symbol transmission. In some embodiments, nodes 2 may have additional or alternative functions or modes available to them, provided that the network 1 comprises at least one relay node.

Data is grouped into data frames, each of which comprises a plurality of symbols modulated on a signal. The data frames need not include a preamble or other fixed-size field, such as those indicating frame length or containing an error-checking code. When modulated for transmission as will be described in more detail hereinafter, each symbol has a respective symbol duration s.

Symbols are signal states or sequences of states that represent data or metadata (e.g. preamble, frame delimiter) to be transferred by the signals between nodes. A sending node A can send information by changing the state of an observable entity (i.e. a carrier signal) at a distance from a receiving node B. A receiving node B recovers the information by inspecting the state of the signal over time and recovering one or more symbols from it. The symbol duration is the time over which the signal state or sequence of states persists. For example, as will be described in more detail hereinafter, a symbol may be encoded on a signal using pulse position modulation, wherein the position of a pulse within a specific well-defined time interval encodes one or more bits. The duration of the pulse itself, being only "on" for a specific time period, is not the symbol duration; the symbol duration is the time interval within which the pulse may occur.

As used herein, the term "symbol" is known to the person skilled in the art, and was originally defined in Part 1.1 of Shannon, C. E. (1948). A mathematical theory of communication, The Bell system technical journal, 27(3), 379-423. The relationship between symbols and frames is discussed in "Andrew S. Tanenbaum and David J. Wetherall. 2010. Computer Networks (5th. ed.). Prentice Hall Press, USA." ("bits" act as an intermediate abstraction here; page 43 discusses the relationship between frames and bits, chapter 2 the one between bits and symbols).

More in particular, the person skilled in the art understands that nodes (i.e., devices) communicate information by transmitting symbols. A symbol has a finite duration and is chosen from a finite set. It is (by construction) impossible to transmit information that cannot be characterised as a sequence of symbols. Symbols are hence the elementary transmission unit: a sender transmits information by modulating a sequence of symbols onto some physical phenomenon, and it is the receiver's only goal to recover that sequence by observing that same phenomenon. To anyone using the communication channel, symbols are the fundamental abstraction shielding the physical world from the information-theoretic one. Symbols are hence like letters in an alphabet: they are an elementary abstract building block. They are somehow physically realised (e.g., written in a particular font, with a pencil or a pen), but their physical realisation is irrelevant to users of a communication channel. The goal is to get the corresponding information (i.e., the identity of the letter) across. Many sets of symbols can be conceived (e.g., the Greek vs the Latin alphabet); sender and receiver agree on what set to use before communication takes place.

A sending node groups symbols together into finite-length frames, which may contain packets. Frames give meaning and structure to a raw stream of symbols: they delineate chunks of data that can only be understood together (e.g., the digits in a measurement) and contain metadata (e.g., who the message is for, what it is about, where it comes from, error correcting codes etc). Note that frames or packets (by definition) comprise multiple symbols: they are a collection of information, and the fundamental information-carrying unit is the symbol. A frame is hence like a postal letter and its envelope.

A send node 4, or a node in a send mode (hereinafter a send node), is configured to transmit data to other nodes 2 in the wireless network 1. A send node 4 is configured to decide whether to transmit data and which data to transmit. A send node 4 may also be thought of as an initiator or originator node, as the data transmitted by a send node 4 may be data which has not yet been received by any relay node 3 or receive node 5 in the wireless network 1. A send node 4 may be in communication with a computing device such as a laptop or a smartphone (not shown) via a communication means which is separate from the network 1, such as a Bluetooth or WiFi or wired connection, and may receive data to be transmitted within the wireless network 1 from the computing device.

A send node 4 may also be configured to receive data from other nodes 2 in the wireless network 1. A send node 4 may use such received data to decide on whether to initiate a data transmission or to continue a current data transmission. For example, a send node may be configured to, when currently transmitting a signal with a first priority and upon receiving a signal with a second, higher priority, to pause transmission of the signal with the first priority, and may optionally also decide to change to a relay mode in order to relay the signal with the higher priority. A send node 4 may be configured to pause a transmission and optionally change to a relay mode upon receiving a signal that does not correspond to a signal currently being transmitted by that send node, and to subsequently relay the received non-corresponding signal. In some embodiments, a send node 4 may be configured to resume a paused transmission. A send node 4 differs from a relay node 3 in that a send node does not retransmit a signal received from another node 2 in the wireless network 1.

A receive node 5, or a node in a receive mode (hereinafter a receive node), is configured to receive data from other nodes 2 in the wireless network 1 and optionally to pass on received data outside the wireless network 1. A receive node 5 may be configured to perform an action in dependence upon received data from other nodes 2 in the wireless network 1, for example in some embodiments the receive node 5 may be comprised in a mobile computing device and may be configured to output a sound when receiving particular data from the wireless network 1.

One or more of nodes 2 may be connected to or incorporated in, for example, a computing device such as a laptop or smartphone. For example, a node 2 may be configured to provide received data to an application running on a computing device such as a web browser. A node 2 may be configured to forward received data to a further, different network.

A relay node 3, or a node in a relay mode (hereinafter a relay node), is configured to receive data and transmit that same data. In more detail, a relay node 3 is configured to receive a first signal (for example modulated on an incoherent wave), where the first signal corresponds to a first symbol comprised in a data frame. The first signal may be a signal transmitted by a send node 4 comprised in the network, or by another relay node 3 comprised in the network, or provided by an external source not comprised in the network.

The relay node 3 is configured to generate and transmit a second symbol as a second signal, where the second signal corresponds to the first signal, that is, the second signal encodes the same bit(s) as are encoded in the first signal. Put differently, a node 2 receiving both the first signal and the second signal would obtain the same symbol from decoding each signal. The second symbol is transmitted at a time offset r which is less than the symbol duration s. The relay node 3 is configured to not relay a received signal if the received signal is received within less than s of a time of receiving the most recent preceding signal. This helps to avoid that the most recently relayed signal is constantly re-relayed by the same node.

The time offset r is chosen such that any pair of corresponding signals, from the perspective of any relay node in the network 1, has a time offset q which is less than s. The condition must hold for all relay nodes simultaneously, but is evaluated from each node's perspective individually: each node only considers signals from nodes in its range, and each node relies on its own notion of time. A node is considered to be in range of the relay node if a signal (for example modulated on an incoherent wave) transmitted by the node and received by the relay node is capable of being interpreted by the relay node as an attempted transmission of data through the network 1. The condition does not necessarily need to hold for nodes which are not relay nodes and the network can still function if the condition does not hold for e.g. one or more receive nodes or send nodes.

Preferably, the time offset r is chosen to be infinitesimally smaller than s/2 which allows s to be as small as possible for a given r, thus minimising the latency and maximizing the throughput of the network. More preferably, the time offset r is chosen to be infinitesimally smaller than s/2 for a value of s that is as small as transmitter or receiver hardware allows, which helps to maximize the latency and throughput of the network.

The time offset r may be chosen in dependence on the limits of the sampling hardware and signal processing logic, for example as small as possible given these limits.

The time offset r may be chosen in dependence upon the diameter of the network (i.e. the maximum number of hops separating a pair of nodes), as will be described in more detail hereinafter.

Figure 2:
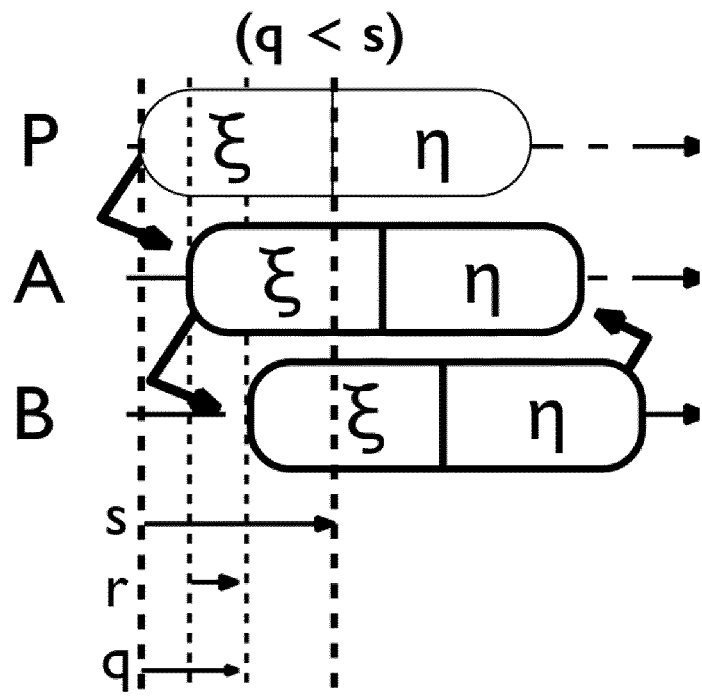
FIG. 2 is a schematic representation of signal timings as implemented according to embodiments of the present invention.

The result of this time restriction on relaying signals is that the first signal is relayed by the relay node 3 as the second signal, while the first signal is still being transmitted by the node from which the relay node received the first signal. Referring to FIG. 2, it can be seen that the time offset q between any two copies of the first signal transmitted by other nodes in range of the relay node A is smaller than the symbol duration s. It can also be seen that node A relays the received signal within r of receiving the signal. As the signal relayed by B is within s of the relay of the signal by P, node A knows that the signal relayed by B is relayed in response to the signal that A has just sent. Thus, node A does not re-relay the signal that is sent by B.

This constraint on the relay offset time allows a relay node to distinguish symbols that still have to be relayed by the node from symbols first forwarded by the node and which are now being relayed again by other relay nodes, thus allowing distributed feedback loops to be avoided. Equivalently, a node sending a signal, which may be a send node or a relay node, maintains a symbol duration that is slightly longer than necessary for a receiving node, which may be a relay node or a receive node, or a send node, to interpret the symbol: in FIG. 2, P's value for s leaves time for the local effects of A's relay step to stabilise. By constraining the time offset in this way, it is guaranteed that there is at least one instant during the transmission of every symbol where nodes in a one-hop neighbourhood are symbol-synchronous, i.e. that they all transmit and receive the same symbol at the same time.

In analogy with wired buses, propagation delays hence induce a maximum symbol rate B=1/s at which the network operates correctly. The symbol rate is expressed in baud (symbols per second). The bus speed b, also referred to as the data rate, is related to the symbol rate via the number of bits carried per symbol. Network topology and the directionality of transmitters and receivers are not constrained. Provided that the nodes form a connected graph and detectors have a sufficient dynamic range, the nodes in the network can discern intensity changes caused by a single initiator among a collectively much stronger set of signals that are emitted by multiple replay nodes, which might include a signal emitted by the node itself.

The wire-like nature of the wireless network according to embodiments of the present invention is enabled by choosing carefully the manner in which the transmitted and received signals are modulated.

Data transmission between nodes occurs via signals which are modulated such that a sum of a first signal and a second signal is capable of being received and demodulated by at least one relay node so as to obtain a sum of symbols including the first symbol and the second symbol. The received sum of symbols is interpreted on the symbol level and does not require knowledge of what happens at the level of the signals that realise the symbols. In order to obtain a sum of a plurality of symbols, a superposition of signals corresponding to the symbols in the sum (possibly constrained with respect to time offsets between the signals) should be recognised by a relay node as a superposition of signals corresponding to at least two of those two symbols, without requiring state information of the signals that is not part of the symbol definition.

For example, a signal which uses amplitude modulation on a coherent wave to encode data can be fully characterised by three parameters at a given point for all points in time: phase, frequency, and amplitude. In order to demodulate such a signal, a demodulator may not need all of this information, for example it may be able to demodulate the signal without needing to know the phase in order to distinguish one symbol from another. However, on a physical level, the wave still has a phase. In order to be able to subtract the wave from an observed signal to counter interference, that phase information is needed to reconstruct the wave.

In networks according to embodiments of the present invention, this physical-level phase information is generally not accessible, since learning the phase of a single signal from a sum of signals alone is not generally possible: phase offsets drive interference patterns. In cut-through networks, which need to learn the phase offsets of nodes in the cut-through network before further processing signals, it is required to measure/model channels first. In networks according to embodiments of the present invention, such measuring/modelling is not required. In addition, cut-through networks typically require complete reception of specific metadata (e.g., addressing information) before making forwarding decisions. In the present invention, full reception of such metadata is not required.

In networks according to embodiments of the present invention, a node which is able to recognise a superposition of signals corresponding to the symbols in the sum as a superposition of signals corresponding to at least two of those two symbols, without requiring state information of the signals that is not part of the symbol definition as defined herein, can overcome interference using only information that it necessarily has by design of the network (e.g. the definition of symbols; the previous symbol, the combined signal).

This is in contrast with, for example, cut-through networks, for example as described in Bo Chen et al., AirExpress: Enabling seamless in-band wireless multi-hop transmission, Proceedings of the 21st Annual International Conference on Mobile Computing and Networking, 566-577. In such networks, signals are typically modulated coherent waves. Nodes in the cut-through network regularly measure and model the effects of concurrent relaying by nodes in a forwarding path in terms of low-level properties of an electromagnetic wave used for transmitting the signals. Nodes use such a model to make predictions about the interference resulting from concurrent relaying, and subtract that predicted interfering signal from the signal they observe to obtain the actual signal to be decoded and forwarded. Thus, in such networks, a sum of signals is interpreted at the level of an electromagnetic wave: a node in such a network may observe interference of signals at a specific point in time which adds a specific amount to the electric field, which then needs to be subtracted from the observed signal and the resulting signal is demodulated.

In contrast, the present invention interprets a sum of signals at the level of symbols.

For example, if a node expects that a signal will be observed which corresponds to interference between a collection of concurrent on-symbols, and the received signal does not match the expectation, the node can conclude that there is an off-symbol in the collection of received signals which should be interpreted as the initiator's signal.

If an amplitude-modulated signal with amplitude $A_1$ is modulated on a coherent wave and observed along with another such signal with amplitude $A_2$, the net (combined) result is generally not an amplitude-modulated signal with amplitude $A_1+A_2$: the result can vary depending on many parameters such as the distance between nodes and the time delay between signals, and may look different to every node. Inferring $A_2$ given $A_1$ and the combined signal is not generally possible in a symbol-synchronous network without knowing parameters of the communication channels that are not part of the definition of an amplitude-modulated signal. Thus the concept of a "sum of symbols" in relation to such modulation techniques is meaningless.

For modulation schemes used in the present invention, however, the "sum of symbols" does have a consistent interpretation among nodes, and this enables the mesh networks according to embodiments of the present invention.

One example of a suitable modulation scheme is modulation of signals representing data on incoherent waves, the resulting incoherent waves being transmitted by and/or received by nodes 2 in the wireless network 1. Such an incoherent wave may be, for example, visible light such as is emitted by a light-emitting diode (LED), a radio signal, an optical signal outside the visible range e.g. infrared or ultraviolet, an acoustic signal which may be audible, ultrasonic, or vibrational. Although incoherent waves interfere in the same way as coherent waves at the physical level, being subject to beatings and destructive interference, (de)modulation techniques that make use of incoherent waves, such as intensity modulation, do not suffer from these phenomena in the same way as would be seen with coherent waves. (De)modulation techniques for incoherent signals allow what is here named "synchronous inter-symbol interference" or SISI (described in more detail hereinafter) to be more easily managed, as SISI can be "designed for" at the modulation level. For example, in Rahaim, M. et al., "*Interference in IM/DD Optical Wireless Communication Networks*", IEEE/OSA Journal of Optical Communications and Networking 9, 9 (2017), D51-D63, it is described that for an IM/DD signal, the impact of interference can be influenced by the choice of modulation scheme.

Consequently, from the perspective of a demodulator of an incoherent wave, interference is caused only by the choice of symbols, rather than by low-level physical aspects outside the control of a node; the effects of destructive interference of the incoherent waves are inconsequential for the demodulation.

A second example of a modulation scheme which allows a sum of a first signal and a second signal to be received and demodulated by at least one relay node so as to obtain a sum of symbols including the first symbol and the second symbol is modulation of a symbol onto a (series of) pulses. Each symbol has a respective symbol duration s, as described hereinbefore. The pulse encoding a symbol, or the total duration of pulses in a series of pulses encoding a symbol, has a duration which is less than the symbol duration. Preferably, a pulse duration is at least 10 times smaller than the symbol duration, more preferably at least 20 times smaller than the symbol duration, still more preferably at least 100 times smaller than the symbol duration, in order to reduce the impact of interference between signals.

However, it is noted that very long symbol durations (i.e. very short pulses, relatively speaking), which can help to reduce the performance impact of interference, may also come at the cost of low bitrate, since transmission of a symbol takes more time. Thus a compromise should be made between the reliability improvements provided by a shorter pulse and the reduced bitrate.

Using a (series of) pulses to encode the symbol allows the sum of symbols to be obtained by demodulating a sum of a first signal and a second signal, because a demodulator in a relay node will look for the presence or absence of a pulse—i.e. the presence of energy in a given frequency band—to recover information, without regard to how the pulse is realized. The signal that a demodulator in a relay node observes is simply the sum of the pulses emitted by neighbouring nodes. Such a detection strategy is not possible when a symbol is encoded by modulation onto a coherent wave, such as is the case in cut-through networks in the state of the art, as in such cases low-level properties of the electromagnetic wave are used to carry information which is then corrupted by interference in unpredictable ways.

For example, a symbol may be modulated using pulse position modulation, in which the temporal position of a pulse within the symbol duration encodes the data. For example, if there are two possible values of the symbol, the first value can be encoded by a pulse occurring within the first half of the symbol duration, and the second value can be encoded by a pulse occurring within the second half of the symbol duration. This is an example of a single pulse representing a symbol.

A symbol may be encoded using pulse width modulation, in which the width, or duration, of a pulse encodes the data. For example, the duration of a pulse relative to the symbol duration may encode the data. Alternatively, an absolute duration of a pulse may encode the data, with pulses being separated by a fixed amount of radio silence, the symbol duration being the pulse duration plus the silence duration.

A symbol may be encoded using pulse amplitude modulation, in which pulses occur at regular intervals and the height or intensity of the pulse encodes the data. The symbol duration is the interval at which the pulses occur.

It is an advantage of embodiments of the present invention that the symbol-synchronous bus provided by a network according to embodiments of the present invention has a latency which is determined only by the duration of a single frame transmission and relatively small propagation delays. A symbol-synchronous bus's end-to-end latency/for an N-symbol frame is bounded by its transmission time p=Ns, the per-node response time r, and the network diameter d, according to equation 1:

$$Ns \leq l \leq Ns + rd \quad (1)$$

where typically rd<<Ns, as will be described in more detail hereinafter.

The per-node response time r is not necessarily constant across all nodes and may vary overtime. The symbol durations is not necessarily constant across all symbols, and may vary over time.

Advantageously, routing and medium access control is not required: the relay nodes transmit essentially concurrently, and so the network can essentially simultaneously connect a source node and a destination node through any and all possible paths.

It is noted that if rd<s, all nodes in the network can operate symbol-synchronously: all nodes agree on the symbol that is being transmitted before the next symbol is sent, which allows for non-destructive priority-based arbitration if one symbol is made to dominate its contenders. However, even though arbitration support is not required, the last symbol of a frame should preferably be sent in such a globally symbol-synchronous manner as all nodes should agree that the transmission of a frame has been completed before beginning transmission of any subsequent frame.

The rd<s criterion implies that r should be infinitesimally smaller than s/2 for idealised "regular" symbol-synchronicity. In this case, the whole network does not need to agree on the current symbol, but only a node's local environment (i.e. nodes in its range towards the initiator (−1 hop) and nodes farther away from initiator (+1 hop). Consequently, in such a case, the "diameter of interest" surrounding a node has size 2, although in some cases the diameter of interest may be larger.

A relay node needs to be capable of recognising an initiating node's new symbol while the symbol is being interfered with by multiple, slightly offset, transmissions of a previous symbol (synchronous inter-signal interference (SISI)). Also, unlike wired buses, a wireless network according to embodiments of the present invention does not have a wire providing a shared clock line and ground level, as is present in wired networks for avoiding lengthy symbol preambles and an ambient interference-free shared reference level for decoding symbols.

In the example described hereinafter, solutions are provided to these issues. However, the skilled person will understand that alternatives are possible and the present invention is not limited to the specific embodiment described hereinafter.

Within the scope of the present invention, nodes may be configured to transmit data using, for example, pulse width modulation, pulse position modulation, frequency shift keying, quadrature amplitude modulation, and may incorporate orthogonal frequency division multiplexing.

Data Transmission

Figure 3:
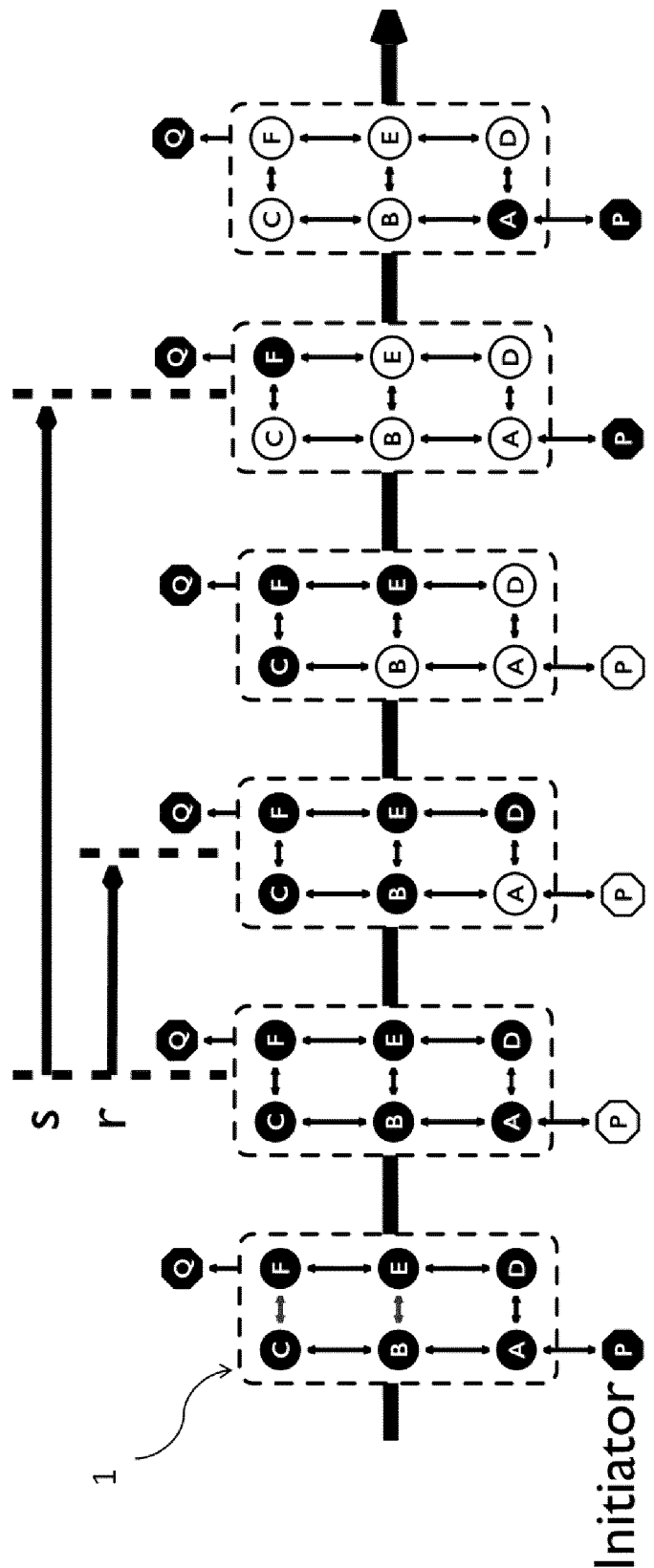
FIG. 3 is a schematic representation of transmission of a signal through a network according to embodiments of the present invention.

On-off keying can be used for data transmission, meaning that nodes transmit data by turning their LEDs on or off for well-defined periods of time. Referring to FIG. 3, when an initiating node P, which may be part of the network 1 but may alternatively be external to the network 1, transmits a symbol, that symbol propagates through the network 1. The propagation in FIG. 3 is shown for a symbol which is represented by the LED state being on (light shaded background of node label), where the previously transmitted signal is represented by the LED state being off (dark shaded background of node label). The time between each successive network diagram is the offset r. Thus first node P is transmitting the symbol represented by the LED being in the on state, followed by node A (while node P is still transmitting the symbol), followed by nodes B and D (while nodes A and P are still transmitting the symbol), followed by nodes C and E (while nodes A, B, and D are still transmitting the symbol), followed by node F (while nodes B, D, C, and E are still transmitting the symbol). It can be seen in the final network diagram that A is now transmitting a new symbol represented by the LED being in the off state, while neighbouring nodes B and D are transmitting the relayed symbol represented by the LED being in the on state. This is because the transmissions by B and D were initiated within a time which is less than s from the time at which A began its transmission; A thus recognises that B and D are relaying the signal that was just sent by A, and therefore A does not re-relay that signal.

This means that nodes are configured, when active in transmitting data, to continuously change the state of their LEDs at slight time offsets. Overcoming SISI in this embodiment requires that nodes are capable of detecting, following and decoding only the LED state changes of the initiating node, without knowledge of the network structure or identity of other nodes. Relay nodes are not, in general, configured to wait until they have verified a received frame before transmitting it themselves; this could lead to the network becoming out of control as spurious signals are spread between nodes.

In this example, a transceiver design is described which solves the SISI issue and implements wire-like features. Such a transceiver can be comprised in a relay node of a wireless network according to embodiments of the present invention.

Figure 4:
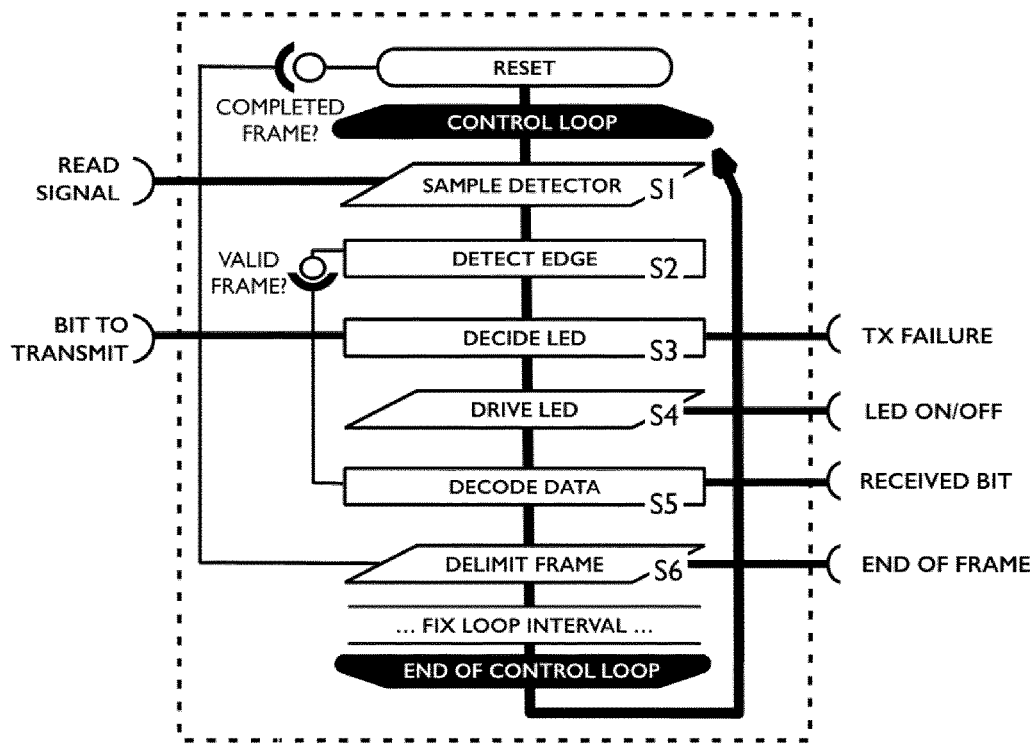
FIG. 4 is a flow chart of a control loop that may be implemented by a transceiver comprised in a node of a network according to embodiments of the present invention.

Referring to FIG. 4, the transceiver is configured to implement a real-time control loop which repeatedly updates a set of interconnected state machines comprised in the transceiver, in sequence while interfacing with a photodetector, one or more LEDs, and an external processor which is comprised in the node but not in the transceiver. The LEDs allow for the modulation of data to be transmitted. The photodetector allows for demodulation of received data by sampling the intensity level of ambient light if the data is encoded using intensity modulation of light. The state machines are configured to process the received intensity samples to recover received data. The state machines are configured to provide successfully received data to the external processor and to retrieve data to be transmitted from the external processor.

The real-time control loop has a control loop interval i which is fixed: every i seconds, a node samples the ambient light level exactly once and performs all processing steps associated with the new sample. If i is sufficiently small relative to the symbol duration s, this approach can help to allow nodes to recognise and start relaying a new symbol at small and predictable time offsets. By sufficiently small, it is meant in this case that i is preferably less than s/2, more preferably less than s/10, still more preferably less than s/100.

Referring still to FIG. 4, one iteration of the control loop comprises the following steps.

In step S1, the transceiver samples a photodetector, retrieving a number that represents, for example, the intensity of ambient light at the time of the sample.

In embodiments wherein the data is encoded by another method than intensity modulation of an incoherent wave, the retrieved number may represent a different property, for example an RSSI level if the data is encoded using a pulse-based modulation scheme (as will be described in more detail hereinafter).

Thus, put generally, in step S1, the transceiver receives a sample of a signal received by the detector.

In step S2, a first state machine comprised in the transceiver reasons on a recent history of samples to detect edges, i.e. that one or more neighbouring nodes have changed the state of their LED(s) from on to off or vice versa and thus have written a symbol to the bus. The first state machine provides the result of the reasoning to a second state machine.

In step S3, a second state machine comprised in the transceiver uses the result to determine whether the transceiver's LED(s) should be on or off during the following i seconds. The decision can also depend on whether the node is acting as an initiating node, since the initiating node for a particular symbol is the first node in the network to write that symbol to the bus. The second state machine therefore also checks whether the external processor has data to be transmitted, retrieving at most one bit at a time to keep the execution time of the control loop small and constant. Absence of data to be transmitted at the external processor results in the node acting as a relay node and relaying the data received via the LED. Presence of data to be transmitted results in the node acting as a send node and sending the data provided by the external processor, unless pause or termination of transmission in send mode is determined to be necessary, for example upon receiving a higher priority signal or upon completing transmission of the data provided by the external processor. By contrasting expected to observed edges, the initiating node can decide to relay perceived symbols when its signal is interfered with by, for example, random noise or a high-priority frame taking control of the bus; in such an event, the external processor may be notified by the second state machine.

In step S4, the LED(s) are set as on or off by the transceiver, depending on the decision made in step S3.

In step S5, a third state machine comprised in the transceiver recovers transmitted data and notes the time (i.e. the number of loop iterations) by leveraging the framing and encoding scheme as described hereinafter. Similar to the second state machine, it writes received data to an external processor one bit at a time.

In step S6, the transceiver decides whether the current loop iteration marks the end of a (valid) frame. As will be described in more detail hereinafter, the decision depends on the time since the last edge detected and the number of bits contained in the frame. If it is decided that the end of a frame has been reached, all state machines are reset and the transceiver is set to not initiate transmissions for w seconds.

w can be chosen, for example, as follows: if d is the diameter of the network determined at deployment time, w=id≈rd can be set such that all nodes agree that the transmission of a frame has been completed before the start of transmission of a subsequent frame, thus enforcing inter-frame global symbol-synchronicity. However, other settings for w are possible within the scope of the present invention.

Edge Detection

In step S2, the first state machine performs edge detection, corresponding to one or more neighbouring nodes changing the state of their LED(s). The number of neighbouring nodes which changed their LED state, and therefore the size of the corresponding intensity change, is not predictable. Additionally, optical wireless communications hardware typically incorporates a causal low-delay high pass filter for removing low frequency interference caused by natural or artificial light sources external to the communication system. The filter is not always necessary; if present, the type of filter can vary but so-called causal infinite impulse response high-pass filters are generally preferable.

In a wireless network according to embodiments of the invention, the intensity signal's AC component is determined by all neighbouring nodes, whereas the detection of an initiator's next symbol depends on a signal that is only emitted by a subset of the neighbouring nodes.

Figure 5:
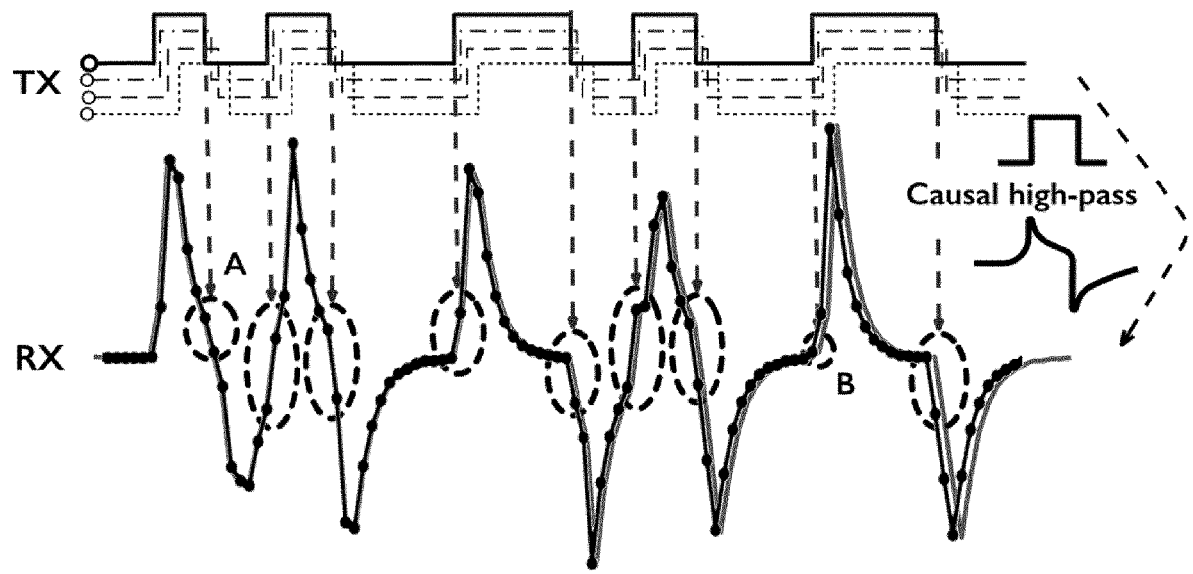
FIG. 5 illustrates a series of symbols to be transmitted and an example of a corresponding signal received by a node, showing artefacts due to neighbouring nodes changing their LED state.

Referring to FIG. 5, a send or relay node that switches its LED(s) causes artefacts to be induced in the signal observed by neighbouring nodes. It can be seen that the onset of a subsequent signal can be obscured by the low-delay high-pass filter's response to a previous signal. Also, an initiator's edge does not always result in a zero crossing, for example at point A, or a fixed-size intensity change, for example at B.

However, it can also be seen that the signal's shape consistently changes from convex to concave or vice versa upon switching of the LED of an initiating node. If the intensity level k samples ago is denoted as $I_k$, and g denotes the number of samples since the immediately preceding edge, then an edge is detected if the following inequalities are satisfied:

$$|I_1 - I_0| > |I_2 - I_1| + \Delta \qquad (2)$$

$$g > \frac{s}{i} - 2 \qquad (3)$$

Inequality (2) is satisfied on convexity/concavity changes and is related to the second derivative of the signal. Inequality (3) implements symbol-synchronicity by separating artefacts caused by subsequently relayed signals from edges that identify a new symbol, while allowing for a clock drift (−1) and imperfect agreement on the start time of a signal (−1).

Provided that Δ is set sufficiently high enough to substantially protect against noise, it is not possible for an intensity modulation/direct detection (IM/DD) signal to accidentally satisfy the constraints (2) and (3). IM/DD SISI does not create false edges by inducing beatings or destructive interference between out-of-phase carrier waves. Advantageously, this approach according to embodiments of the present invention does not depend on the exact intensity of the signal transmitted by the initiating node, nor on symbol duration, nor is it particularly sensitive to filter parameters: the method according to embodiments of the present invention exploits the shape of the filter's step response. This particular approach imposes a minimum of six control loop iterations per symbol: nodes observe and relay an edge (1) and observe the response of the neighbours for which they relayed (2), which may be just ahead of them in their control loop (3). A node then needs two more samples (12, 11) of the signal reverting towards its zero level (4, 5) before it can detect the next edge (6).

Frame Structure

For symbol-synchronous buses, synchronisation preambles are ineffective as nodes must start decoding and relaying a signal long before the preamble is complete. In this example implementation of the present invention, the self-clocking nature of Manchester encoding is relied upon to synchronise nodes to a transmission. When Manchester encoding is used, the bus speed b is equal to half the symbol rate B. The system encodes 0 and 1 bits as on-off and off-on respectively, forcing an edge in the middle of every bit. To account for clock drift and variation in propagation paths and delays, the decoding state machine interprets edges as if they had arrived on the nearest integer multiple of s relative to the preceding edge, and subsequently resynchronises.

Other conventionally used fields can be omitted from the frame structure, for example those containing an error-checking code and those indicating frame length. The absence of an edge for a certain period of time can be used to mark the end of a transmission; where Manchester encoding is used, the time period is preferably 2.5 s/i, because Manchester encoding forces an edge at least every 2 s/i samples and edges arriving later would be interpreted as if they had arrived out of time, potentially corrupting the message.

Frame corruption in the present invention can be detected by constraining the payload size in bits to a fixed set of known values, which may be for example a set of multiples of a small integer f (for example f less than 10); messages that do not satisfy the constraint are assumed to have been corrupted by spurious or missing edges. This avoids the need to indicate frame length within each frame. Larger values for f can allow more errors to be detected, but can reduce network performance as time is needed for transmitting padded messages.

Each frame can be started with a two-bit sequence, e.g. (00), which allows to quickly suppress signals resulting from noise-induced, wrongly timed edges and can prevent transient responses in the receiving hardware from obscuring payload data. Each frame can be ended with a single 0, which guarantees that a transceiver's LED(s) are in the off state at the end of every frame transmission. This frame structure can be seen in FIG. 6, which shows the signal involved in transmitting four bits of payload: 1001.

The above-described frame validation scheme can be used to determine the edge detection threshold $\Delta$. This can be inferred from valid frames by keeping track in the first state machine of an exponentially weighted average of the value $\varepsilon = |I_1 - I_0| - |I_2 - I_1|$ observed for edges in valid frames. The edge detection threshold $\Delta$ can be determined as a fixed fraction of $\varepsilon$, for example $\Delta = \varepsilon/8$, which allows to tolerate some variation in $\varepsilon$ values without requiring division hardware. The edge detection threshold $\Delta$ is preferably constrained to start at and never become less than a minimum value $\Delta_m$, which is the smallest value that allows elimination of uncontrolled signal storms which can be induced by random noise causing an edge detection event. $\Delta_m$ generally depends on the noisiness of the network's environment and can be estimated when the network is deployed by increasing its value until the network is stable when no messages are being sent by the nodes.

Arbitration

In Manchester encoding, an edge only occurs at the boundary between two bits if the two bits are identical. In the edge detection strategy as described hereinbefore, the presence of an edge dominates its absence: initiating nodes which observe an edge where they did not cause one due to their transmitted signal can detect the presence of a contending initiating node without corrupting the signal transmitted by the contending node. Based on these two observations, a priority-based arbitration scheme can be provided. Nodes are configured to not interrupt ongoing messages; nodes are configured to start transmitting available data exactly w/i control loop iterations after the end of a preceding message, which allows to synchronise contending initiating nodes down to approximately w seconds.

Assuming a sufficiently large symbol duration s that the inequality rd<s is satisfied, this arbitration scheme allows to induce a complete ordering on the set of all possible messages: frames with longer run lengths of the same bit dominate those with shorter run lengths, and longer frames dominate shorter frames. Expressed mathematically, a frame can be prioritised by mapping a natural number $p<2^N$, which indicates the priority level of the frame, to an N-bit priority code prefixed to the frame payload. Frames with a higher priority level are guaranteed to suppress those with a lower priority without being corrupted by the lower priority frames. For a given value of p, a priority code C[j], $0 \le j \le N$, can be computed according to equation 4:

$$C[j](p) = \begin{cases} 0, & \text{if } j = -1 \text{(recursive base case), else} \\ C[j-1](p), & \text{if } \left\lfloor \frac{p}{2^{M-j-1}} \right\rfloor \bmod 2 = 1, \text{else} \\ 1 - C[j-1](p), & \text{if } \left\lfloor \frac{p}{2^{M-j-1}} \right\rfloor \bmod 2 = 0. \end{cases} \quad (4)$$

The frame prioritisation may be carried out by an application which is linked to the network. For example, an application program may be run on a computer which is in communication with one or more nodes of the network.

Relay Node Implementation

An example hardware implementation for a relay node is now described, although it will be appreciated by the skilled person that this is by way of example only and other hardware implementations are possible within the scope of the present invention.

Figure 6:
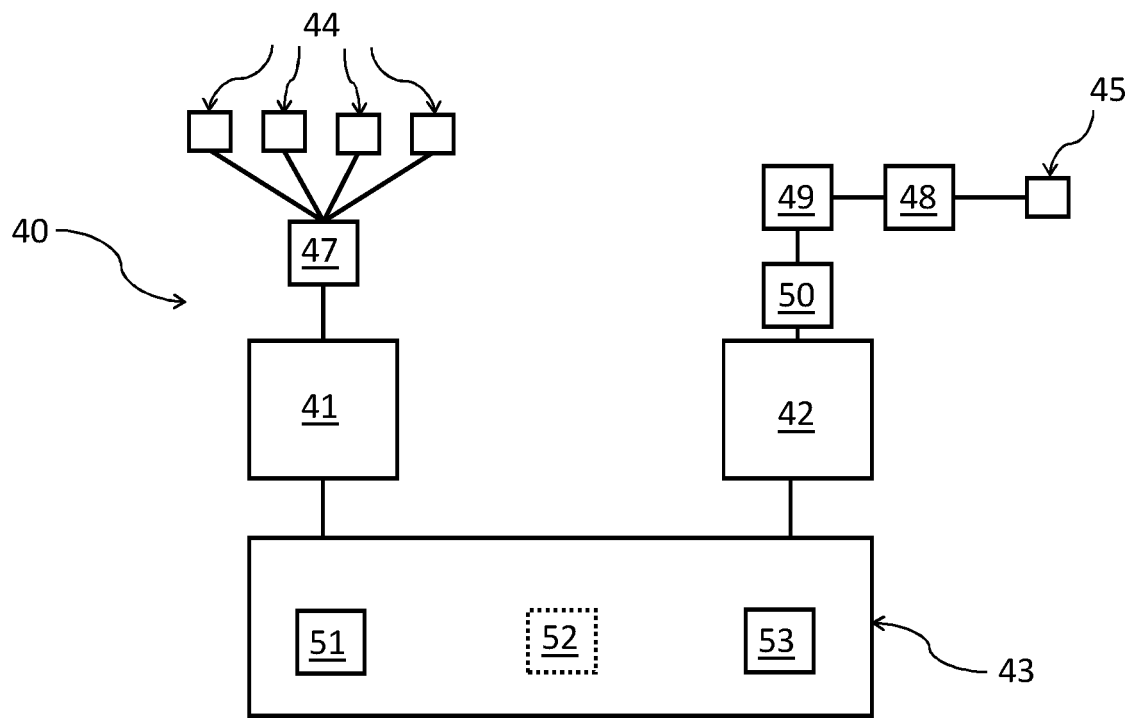
FIG. 6 is a schematic representation of a relay node comprised in a network according to embodiments of the present invention.

Referring to FIG. 6, a relay node 40 comprises a transmitter front end 41, a receiver front end 42, a control module 43, a plurality of high-brightness white light LEDs 44, and a photodiode 45. The transmitter front end 41 is coupled to the plurality of LEDs 44 and configured to drive the LEDs 44 via a power transistor 47. The receiver front end 42 is configured to sample the photodiode 45 via (listed in order of electrical connection from the photodiode 45 to the receiver front end 42) a transimpedance amplifier 48, an AC-coupled amplifier 49 for filtering incoming signals using an RC high-pass filter, and a seventh-order low-pass Butterworth filter 50 for preventing aliasing when reading a signal through an analogue to digital converter over a serial peripheral interface.

The transmitter front end 41 and the receiver front end 42 are all electrically coupled to the control module 43.

The control module 43 comprises a first processor 51, an optional second processor 52, and a memory 53. The control module 43 is configured to receive data from the receiver from end 42, to provide data to the transmitter front end 41. The first processor 51 is configured to implement the real-time control loop as described hereinbefore, and may access data stored in the memory 53. The optional second processor 52 is configured to write data to memory 53, which can then be accessed by the first processor 51 and provided to the transmitter front end 41. The data may be received from, for example, an application running on top of the network. For example, a processor running an application program, which may be the first processor 51 or the second processor 52 or a processor external to the node, may check an external input source or sensor or other input for data and provide that data to the transceiver, for example by writing it to the memory 53. For example, if the application program is a program for monitoring and/or controlling a fire alarm system, the data may correspond to a temperature reading. If the application program is a program for sending and receiving text messages, the data may correspond to text input by a user. The second processor 52 may be used, for example, for evaluation purposes.

In one embodiment, the control module 43 is a Pocket-Beagle which comprises a TI Sitara AM335x chip, which itself comprises a single ARM Cortex-A8 core and two real-time coprocessors or programmable real-time units (PRUs). The PRUs are microcontrollers which provide single-cycle GPIO access and deterministic execution times at 200 MHz. Except for loads and stores, all instructions are guaranteed to execute in a single processor cycle. The PRU for implementing the real-time control loop (corresponding to the first processor 51) leverages the CYCLE register available in the PRU, which provides time measurements at single-cycle (i.e. 5 ns) granularity, to make the PRU implementing the real-time control loop wait for the completion of its control loop interval i. By toggling a GPIO pin on every iteration and determining the lowest setting for i that consistently allows for timely completion of the loop's processing steps with a logic analyser, the control loop interval was established at 2.5 µs. Due to memory stalls, control loop iterations may sometimes still complete hundreds of nanoseconds too late; the transceiver logic interprets such occurrences as clock skew.

The remaining PRU (corresponding to the second processor 52) acts as an external microcontroller for implementing application logic: it is configured to interface with the first PRU via two three-entry, 5.25 kB cyclic buffers in shared memory 53 to pass data to the first PRU without compromising the real-time behaviour of the first PRU.

Testbed Setup

Figure 7:
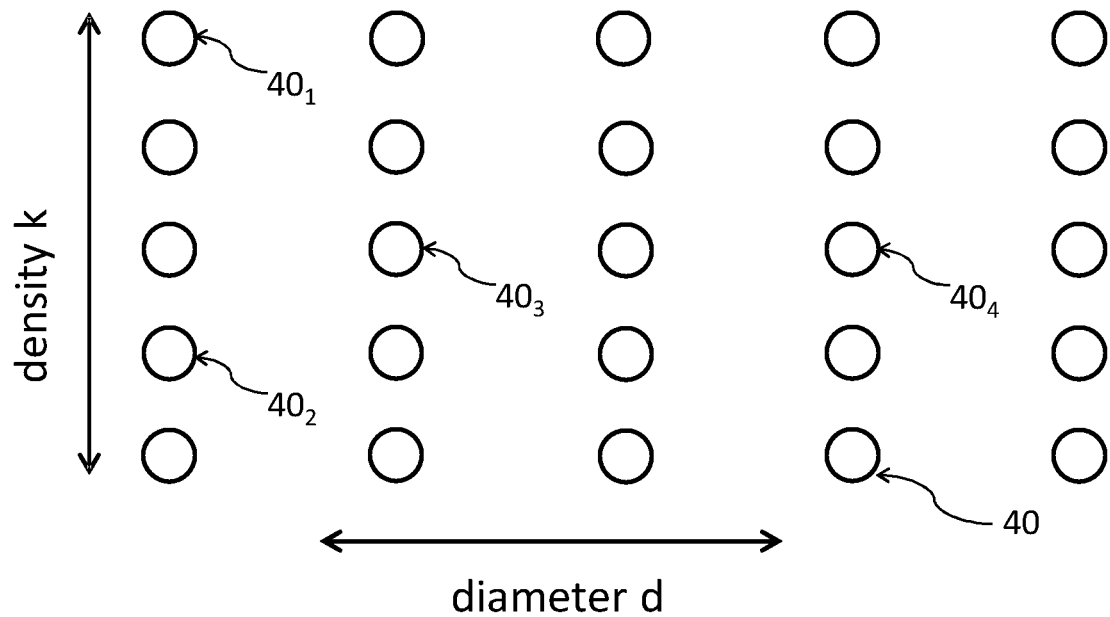
FIG. 7 is a schematic representation of a test bed network according to embodiments of the present invention.

Referring to FIG. 7, a testbed network 50 according to embodiments of the present invention comprising twenty-five relay nodes 40 configured as described in the preceding section was created in a laboratory environment. The nodes were all positioned in the same plane on a 5-by-5 grid and oriented such that their LEDs point towards a grey painted surface half a metre away, connecting the nodes through diffuse reflection of signals transmitted by the nodes. The dimensions of the testbed and the relative positions of nodes within it were chosen to enable an examination of how the network's performance characteristics scale with parameters of the network topology in a controlled setting. In particular, as shown in FIG. 7, the number of columns in the grid of nodes corresponds to the network diameter. Nodes in different columns are positioned one hop apart, so a signal from a node in one column reaches those in neighbouring columns, but not those in non-neighbouring columns. This assumes a configuration of the network as follows: 16-bit frames, frame delivery ratio across one hop in isolation >95%; across two hops without relay <0.5%; s/i=9.

The number of rows in the grid corresponds to the network's density k, since nodes in the same column form a clique, i.e. they are capable of correctly receiving each other's signals without requiring intermediate relays. Higher values for k thus provide more links between nodes in neighbouring columns. Thus, for example, nodes 401 and 402, being in the same column, are one hop apart; nodes 402 and 403, being in different, neighbouring columns, are one hop apart; but nodes 401 and 404, being in different, non-neighbouring columns, are more than one hop apart.

The testbed is positioned such that, on one side, it is exposed to a variety of natural and artificial light sources present over the periods during which the experiments were performed. The three other sides are opaque and diffusely reflect optical signals.

Each node connects to a WiFi network that provides a management back-plane to applications that are implemented on the second PRU to collect evaluation data without disturbing the symbol-synchronous bus. Concretely, the transceiver logic embodied in the first PRU reports frame transmission and reception to the Beaglebone's other processors using TI's RPMSg framework and associates a timestamp with each of these events at an i=2.5 µs granularity by inspecting its CYCLE register.

An InfluxDB time series database logs these events, providing a complete history of what data was transmitted and received by which node at which point in time.

Performance Characteristics

Traffic patterns were replicated resembling those used to interact with SPI or I2C-based peripherals. Specifically, pairs of nodes were instructed to exchange frames in a request-reply pattern. One node sends a request frame carrying L bits of data through the network which is configured to run at a speed b; the receiving node replies with a reply frame of length L immediately after it detects the end of the request frame. This process then repeats, allowing for the study of end-to-end latency, reliability and goodput.

With respect to this testbed system, latency is the delay between the time at which the request node completes its request by receiving its own message through the network and the time at which it completes receiving the corresponding reply. Reliability is the proportion of reply frames correctly received by the request node within all reply frames that were sent. Goodput is the amount of bits in valid received frames divided by the timespan of the repeated request reply process from the request node's perspective. The amount of requests in such an exchange was set to 10 and thereafter the process was restarted with a new, random pair of nodes, thus eventually collecting information on the performance of every end-to-end path within the network. Such variation of traffic flows does not involve network-wide reconfiguration: no node is aware when another node will transmit; any node can decide to use the full capacity of the network at any time without prior or consistent resource allocation.

Unless indicated otherwise, metrics reported in this evaluation that are based on this procedure average over all end-to-end traffic flows. All data points for b<25 kbps consider >500 frames.

Latency

Figure 8:
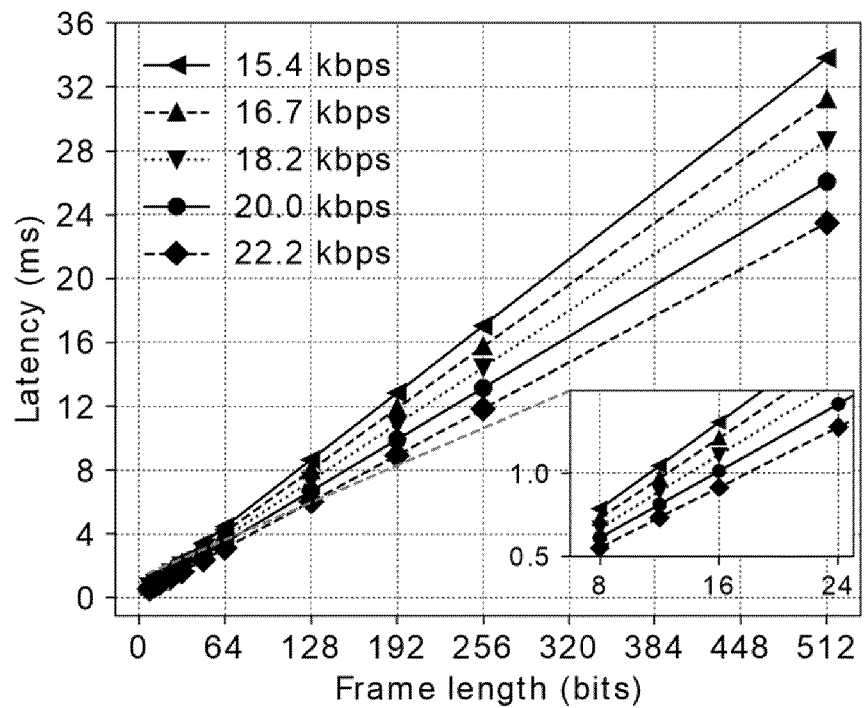
FIG. 8 is a plot of end-to-end latency as a function of frame length for the network described herein with reference to FIG. 7, for varying bus speeds, with an inset showing the region of latency from 0.5 ms to 1.5 ms in more detail.

Referring to FIG. 8, the end-to-end latency is plotted as a function of frame length. It can be seen that the latency is proportional to the speed of the bus and the amount of data to be transmitted.

As shown in the inset to FIG. 8, a network according to embodiments of the present invention thus enables sub-millisecond latency as long as the amount of data to be transmitted is sufficiently small relative to the speed of the bus, which in the testbed topology allows to communicate a 2-byte payload across a five-hop network in one millisecond. As shown in the figure, only certain discrete settings for the bus speed b are possible, since symbol duration s=1/B can only be configured in terms of the number of samples per symbol. However, it is noted that this limitation is a consequence of the specific transceiver design and the present invention is not limited thereto; other transceiver designs, such as fully analogue transceivers, are possible within the scope of the present invention and do not experience the limitation of bus speed to discrete values.

Figure 9:
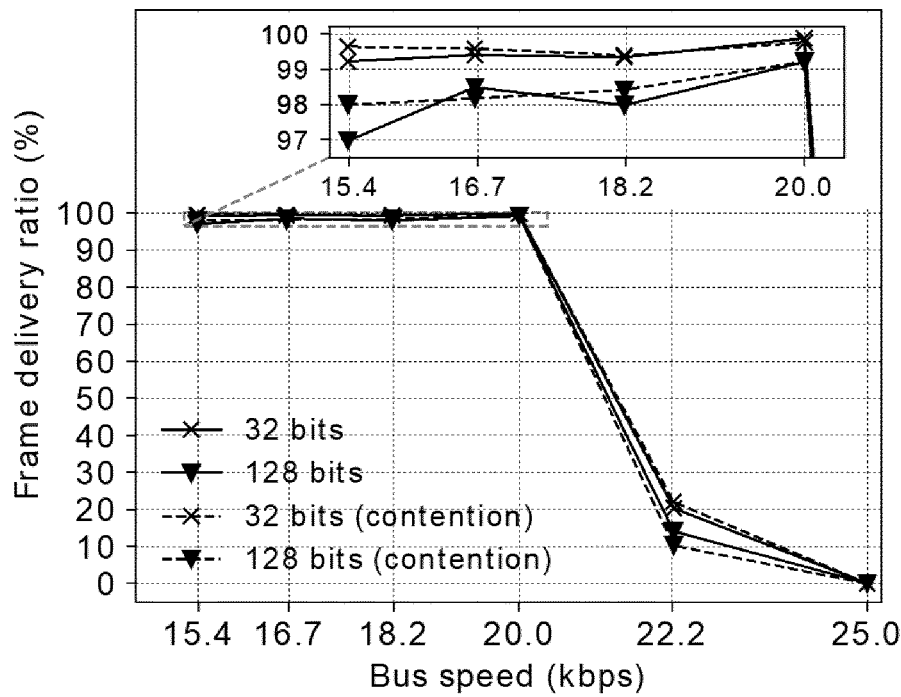
FIG. 9 is a plot of end-to-end reliability, expressed as frame delivery ratio, as a function of bus speed, for 128-bit and 32-bit frames, for the network described herein with reference to FIG. 7. The inset is a detailed view of the region from frame delivery ratio of 97% to 100%.

The key lower bound on latency is the fixed time cost associated with transmitting the three start-of-frame and end-of-frame bits, as evidenced by the non-zero y-axis intercept of the lines in FIG. 9. The rest of the latency profile is driven by payload size only. Thus the key lower bound on the latency is the fixed time cost associated with transmitting a single frame, in contrast with conventional networks which incur the fixed time cost at every hop, i.e. multiple times in transmitting between nodes separated by more than one hop. This feature is common to all implementations of the present invention, not only this example implementation. The obtained latency numbers are virtually deterministic: for any given bus speed and frame length, the latencies vary by no more than tens of microseconds across traffic endpoints or experimental replicates. In networks according to embodiments of the present invention, variance in latency due to hop-by-hop relaying across paths of different lengths is negligible, since the main sources of such variance are propagation delay between neighbouring nodes ($r \approx i = 2.5$ is per hop in the specific implementation described in this section) and differences in the positions of nodes within their control loops (in the specific implementation described in this section).

Reliability

In FIG. 9, the frame delivery ratio (reliability) is shown as a function of bus speed. It can be seen that for messages no longer than a few bytes and up to a bus speed of 20 kbps, the end-to-end frame delivery ratio is practically constant at 99%, after which reliability sharply decreases as the symbol-synchronicity time constraint can no longer be met consistently.

Reliability primarily depends on frame length and favours short frames: delivery ratios decrease by roughly one percentage point when using 128-bit instead of 32-bit frames. Contention, on the other hand, has no significant effect. When configuring two nodes to simultaneously reply to the same request frame using a different priority code, the high-priority frame is received as reliably as frames that are not contended with.

The maximum speed of 20 kbps corresponds to a transceiver configuration with 10 samples per symbol. When increasing speed and hence reducing the number of samples per symbol, we note that the network deteriorates before the 6 samples per symbol limit as discussed hereinbefore. Without wishing to be bound by theory, it is thought that this effect occurs because interference domains are larger than communication domains: short-term variance in observed intensity values for a given symbol (i.e. E as discussed hereinbefore) can result in sporadic interference from nodes that are more than one hop away.

Variance in perceived intensity values can also cause frame loss. It is observed that frames that become corrupted are typically received as several fragments, because E-values are occasionally too small to lead to successful edge detection by being indistinguishable from random noise. Due to the absence of a timely edge, nodes then prematurely terminate an ongoing frame. Other failure modes, such as spurious symbols corrupting a transmission, are rare, since nodes are configured to be careful about toggling their LEDs (i.e. A is set conservatively). These observations suggest that the relationship between frame length and reliability is inherently stronger for a network according to embodiments of the present invention than for conventional mesh networks: nodes must decide how to interpret a symbol while that symbol is ongoing, and cannot wait for the completion of a frame to mask transmission errors before relaying it.

Goodput

Figure 10:
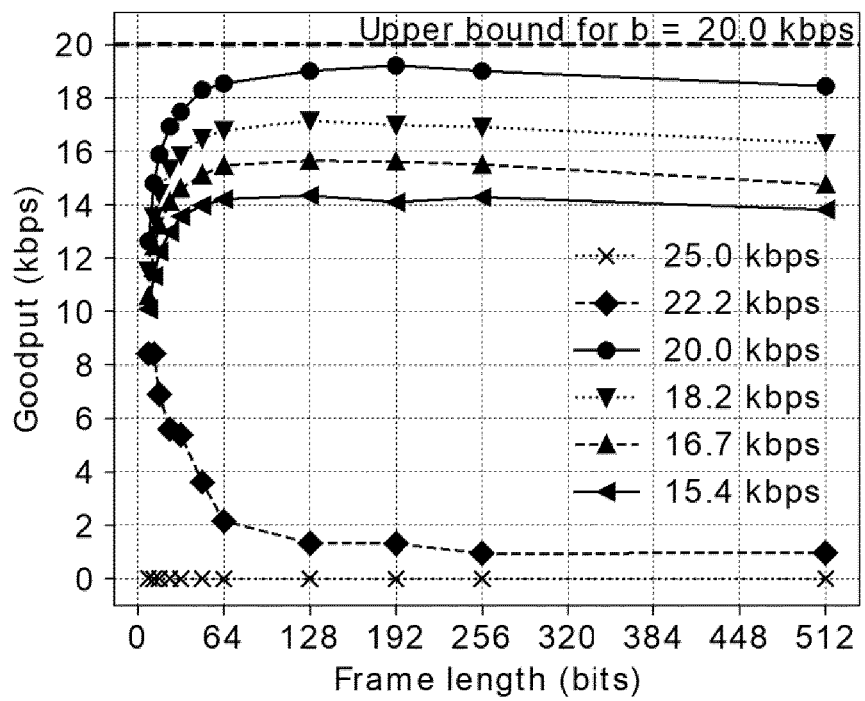
FIG. 10 is a plot of end-to-end goodput as a function of frame length, for the network described herein with reference to FIG. 7, for varying bus speeds.

Referring to FIG. 10, the end-to-end goodput is shown as a function of bus speed. It can be seen that goodput increases with bus speed up to b=20 kbps, that is, up to the point at which the symbol-synchronicity constraint breaks and the network stops operating reliably. When considering frame length, goodput is subject to a trade-off: longer frames allow to amortise the overhead of the time it takes to transmit the three start-of-frame and end-of-frame bits, plus 1.5 s to indicate the end of a frame, plus w to enforce global symbol-synchronicity, over a larger amount of payload data, but are also considerably more likely to be corrupted. Goodput-optimal frame lengths are situated between 128 and 256 bits and result in a goodput of 19 kbps at a bus speed setting of 20 kbps. With such settings, the is network capable of utilising 19/20=95% of its theoretical throughput capacity for application data. Shorter frames enable low-latency applications, but incur a considerable goodput penalty: when using 8-bit frames, the network attains only 63% of its throughput capacity. Larger-than-optimal frame sizes cause slow goodput loss, so they may be better sent as fragments.

Scaling Behaviour

The scaling behaviour of the network is evaluated by removing rows and columns of nodes from the deployment illustrated in FIG. 7. Removing a column reduces the number of nodes in the network by five and decreases its diameter d. Due to the parameters of the testbed, this form of diameter scaling can continue until only a five-clique of nodes remains. Density scaling, i.e. removing a row of five nodes, leaves the network's diameter unchanged, but decreases its density k until only a five-node, five-hop network remains. For all ten topologies obtained this way, the analysis of latency, reliability, and goodput as detailed in the previous section was repeated.

It was observed that the end-to-end latency was practically unaffected by the network's diameter or density. Such latency is, by design, virtually deterministic and effectively independent of traffic endpoints. Topology-induced differences in latency are hence on the same order as the granularity with which the testbed infrastructure can measure latency (i.e. 2.5 μs).

Reliability, and therefore goodput, were observed to be substantially affected by parameters of the network topology.

Figure 11:
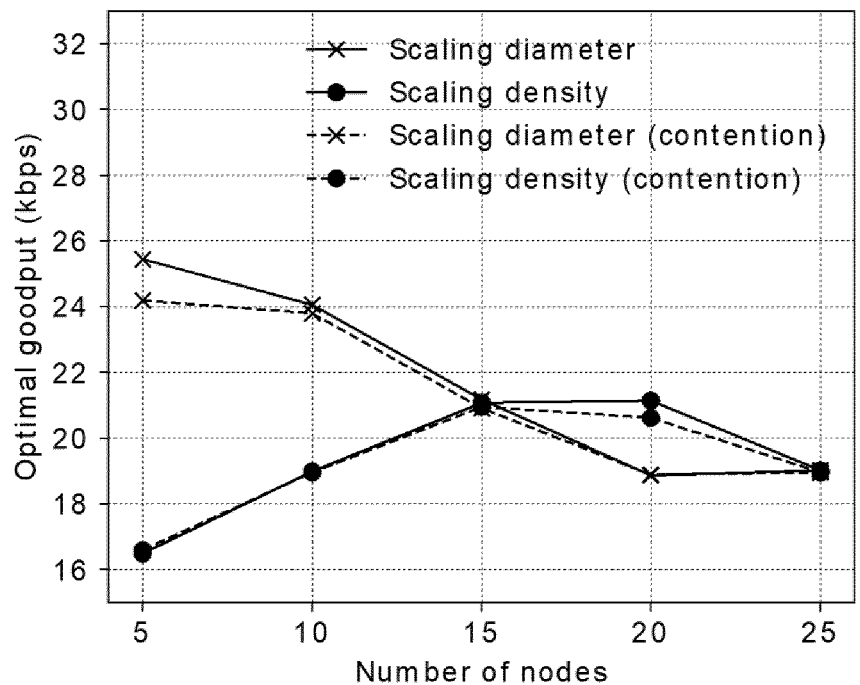
FIG. 11 is a plot of optimal goodput as a function of the number of nodes when scaling the diameter and the density of the network described herein with reference to FIG. 7.

Referring to FIG. 11, the goodput is plotted for each of the network topologies under consideration. When scaling the testbed's diameter, goodput tends to decrease as the number of nodes increases, falling from 25.4 kbps in a five-clique to the 19 kbps observed in the previous section for a 25-node network. When scaling network density, however, goodput increases from 16.5 kbps to 19 kbps when going from a minimally to a maximally dense configuration. In neither scaling scenario does the presence of contention have a considerable impact.

Figure 12:
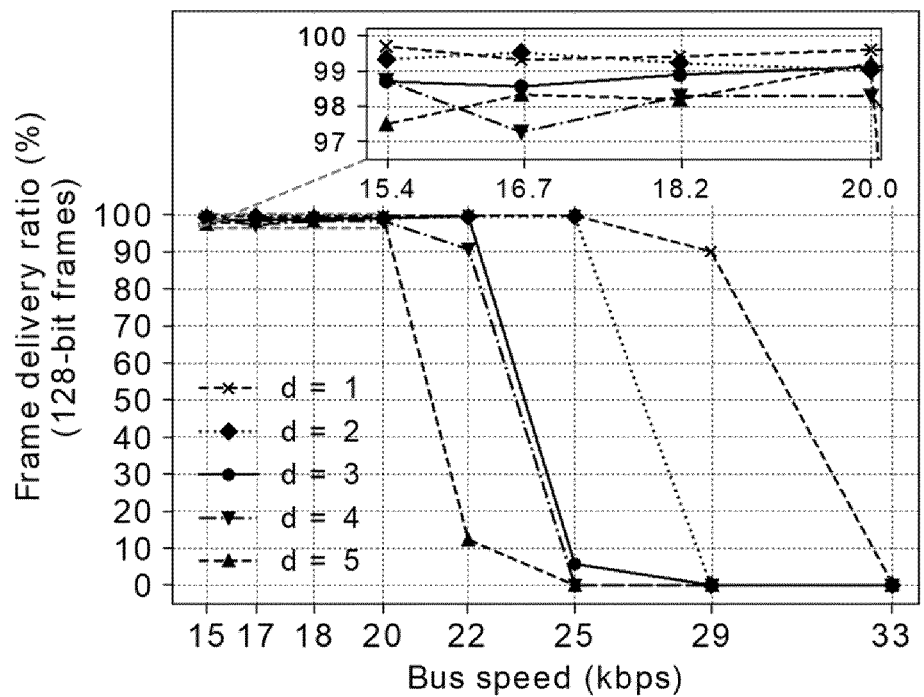
FIG. 12 is a plot of end-to-end reliability, expressed as frame delivery ratio for 128-bit frames, as a function of bus speed, for varying network diameters of the network described herein with reference to FIG. 7.

Referring to FIG. 12, the reliability is shown as a function of bus speed for varying diameter d and 128-bit frames. When increasing the number of hops in a network, the reliability curve as discussed in relation to FIG. 9 shifts to the left. The highest bus speed setting at which the network operates reliably thus decreases. The goodput-optimal bus speed setting hence goes from 28.6 kbps to 20 kbps as d goes from 1 to 5, explaining most of the goodput loss. The inset demonstrates that adding nodes to the network also has a measurable effect on reliability that is independent of this left shifting, introducing roughly a percentage point of additional frame loss in this scenario. When adding hops to the network, a node becomes exposed to interference by other nodes whose signals are further offset in time. To maintain symbol-synchronicity, nodes therefore need to rely on a longer symbol duration and hence a lower bus speed setting. In the ideal situation, the time offset between signals emitted by neighbouring nodes corresponds to one control loop interval i=2.5 μs, making the curve shift to the left with one discrete speed setting (i.e. the minimal value for s/i for a reliable network increases by one). As shown in FIG. 15, this means throughput capacity (i.e. optimal b, the point of network collapse in terms of bus speed) decreases sublinearly with increasing d, since b is inversely proportional to the number of samples per symbol (i.e. s/i). In a contention-free scenario, it is expected that the need to decrease bus speed due to diameter scaling should eventually halt, since symbol-synchronicity is a local constraint.

Scaling Network Density

Figure 13:
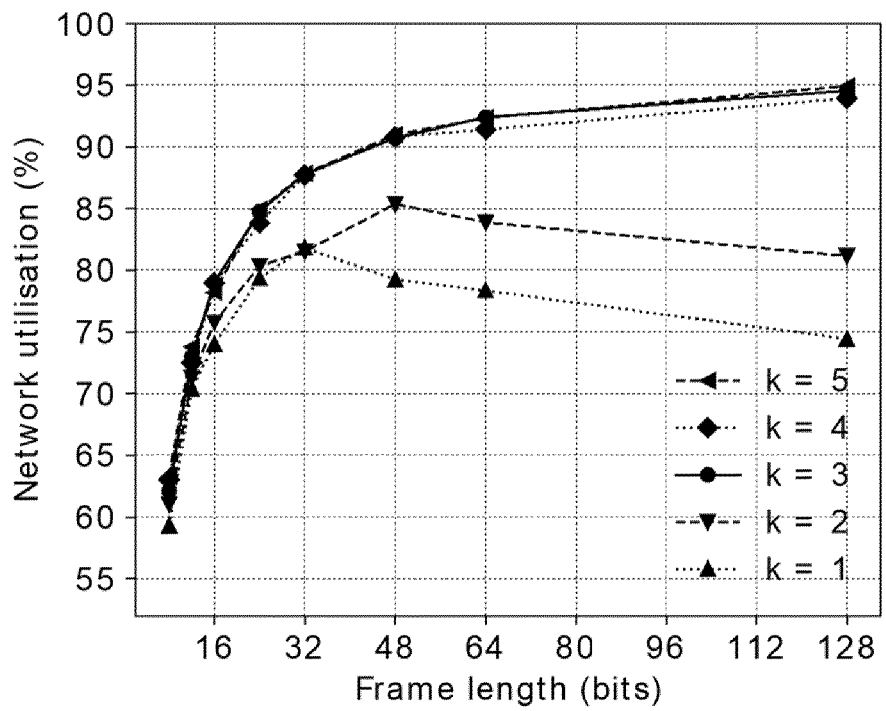
FIG. 13 is a plot of network utilisation, i.e. the ratio between observed goodput and theoretical goodput based on the optimal bus speed, as a function of frame length, for varying network densities of the network described herein with reference to FIG. 7.

Referring to FIG. 13, the frame length is plotted as a function of network utilisation, i.e. the ratio between observed goodput and the theoretical value based on the optimal bus speed b, being the bus speed that maximizes observed goodput across all configurations of bus speed and frame size. This FIG. 13 illustrates why scaling network density tends to improve goodput. In networks with low density, the network reliability decreases more rapidly with increasing frame length. The net result is that, for k=1 and k=2, the tail of goodput curves is tilted downward relative to more dense settings. Consequently, maximum goodput is achieved for frame lengths of 32 and 48 bits, far smaller than the 128-256 bits observed for sufficiently dense topologies. Network utilisation therefore tops out at around 80% instead of 95%. The optimal bus speed setting, used to obtain these results, is relatively stable, varying between b=20 and b=22.2 kbps.

Without wishing to be bound by theory, it is thought that several phenomena may explain the effect of network density on the relation between frame length and reliability. For example, synchronous intensity modulation by multiple nodes can result in larger intensity variations than would be caused by any single node (i.e. signals "interfere constructively"). Additionally, networks with higher density exhibit a larger number of redundant paths: if a node fails to detect an edge in a signal, one of its neighbouring nodes may still detect and subsequently relay it to the former node, which masks the initial failure since nodes can tolerate some slack on the arrival time of edges.

Pulse-Based Implementation

An example hardware implementation for a relay node wherein the data is encoded using a pulse-based modulation scheme is as follows. In this example, pulse position modulation is used to encode the data, i.e. the time interval between pulses carries the information.

The relay node can be implemented by a microcontroller board with an on-board radio, for example ESP8266 (Espressif Systems, Shanghai, China), which is capable of generating signals in a well-defined frequency band.

Sending a pulse corresponds to having the radio send a dummy radio frame. The function of the dummy radio frame is to provide a short burst of activity in the form of a pulse of duration P in a given radio band, and so the actual contents of the frame sent is not relevant and can be randomized.

Thus the analogue of the LED switching described hereinbefore in the context of intensity modulation of an incoherent wave is, in the case of pulse-based signals, the action of sending a short arbitrary dummy frame in a given frequency band. The pulse length P is preferably as short as the radio interface allows.

Pulses are detected by the relay nodes by sampling the Received Signal Strength Indicator (RSSI) level reported by the radio's software interface. If the RSSI is greater than a predetermined threshold value, it can be concluded that a pulse is being received. The analogue of retrieving a number that indicates the intensity level of ambient light as perceived by a photodetector is, in this implementation, retrieving the RSSI level from the radio. Detecting an edge is replaced by detecting a pulse. In some embodiments, the microcontroller is configured to collect a sample in a time interval S that is a few times smaller (for example, two to five times smaller) than the pulse duration P. The frame duration L, pulse duration and sample interval (if used) are subject to the following relation: S<<P<<L.

The microcontroller implements a transceiver which is configured to receive samples of a signal received by the detector (e.g. comprised in the on-board radio) from the detector, to demodulate the received samples and to output demodulated data. The transceiver is configured to receive data to be transmitted, and to modulate the received data to be transmitted and provide the resulting signal to the emitter, e.g. a radio transmitter comprised in the on-board radio.

The transceiver for a pulse-based implementation functions in a similar way to the transceiver described hereinbefore for an intensity modulation implementation.

The transceiver for the pulse-based implementation has a similar high-level architecture in terms of the functionality of the state machines as described hereinbefore. Instead of detecting edges, pulses are detected; instead of transmitting intensity modulated incoherent waves, pulses are transmitted.

The transceiver for the pulse-based implementation is configured to ensure symbol-synchronicity by synchronising to the pulse train, i.e. by keeping track of where the symbol boundaries are by looking at the point in time where the last pulse was received and which symbol was last received. The transceiver can tolerate some slack on the precise arrival time of pulses to deal with potential "smearing" of symbols due to relaying. The transceiver can be configured to leaves some "empty space" at the end of a symbol to prevent pulses relayed near the end of one symbol from running into the next one.

What is claimed is:

1. A wireless mesh network of nodes comprising at least one relay node, wherein the at least one relay node is configured to:
  receive a first signal, the first signal corresponding to a first symbol comprised in a data frame, the first symbol having a first symbol duration s; and
  generate and transmit a second signal, the second signal corresponding to the first signal;
  wherein the first signal and the second signal are modulated such that a sum of the first signal and the second signal is capable of being received and demodulated by at least one relay node so as to obtain a sum of symbols including the first syMbol and the second symbol;
  wherein a time offset r between the start time of the transmission of the second signal by the relay node and the time at which the first signal was received by the relay node is smaller than the first symbol duration s; and wherein the time offset r is chosen such at any pair of corresponding signals has a time offset q which is less than s from the perspective of any relay node in the network.

2. A network according to claim 1, wherein the at least one relay node is configured, upon receiving a subsequent third signal, to relay the third signal only if the third signal is received at a time offset relative to the time of receiving the first signal which is greater than or equal to the first symbol duration s.

3. A network according to claim 1, wherein the nodes are configured to communicate by optical wireless communication.

4. A network according to claim 1, wherein a relay node or a send node is configured to transmit signals using on-off keying.

5. A network according to claim 1, wherein a relay node or a send node is configured to transmit signals using a self-clocking code.

6. A network according to claim 5, wherein a relay node or a send node is configured to transmit signals using a run-length limited code.

7. A network according to claim 5, wherein a relay node and optionally a send node is configured to delineate a data frame by suppressing a clocking event in a signal encoded with a self-clocking code.

8. A network according to any of claim 5, wherein a relay node and optionally a send node is configured to detect a state change in a received signal by determining whether the received signal is convex or concave.

9. A network according to claim 8, wherein determining whether the received signal is convex or concave comprises comparing a difference between at least two approximations of the signal's first derivative with a noise threshold value.

10. A network according to claim 9, wherein a node comprised in the network is configured to modify the noise threshold value in dependence upon a background noise level.

11. A network according to claim 9, wherein a node comprised in the network is configured to modify the noise threshold value in dependence upon intensity values of valid received signals.

12. A network according to claim 1, wherein a send node is configured to pause, halt, or modify a transmission of data in dependence upon a signal received from another node in the network.

13. A network according to claim 1, wherein a relay node and optionally a send node comprises a detector, an emitter, a processor and a transceiver, wherein the transceiver is configured to receive samples of a signal received by the detector from the detector, wherein the transceiver is configured to demodulate the received samples and to output demodulated data, wherein the transceiver is configured to receive data to be transmitted, and wherein the transceiver is configured to modulate the received data to be transmitted and provide the resulting signal to the emitter.

14. A network according to claim 13, wherein a relay and optionally a send node is configured to:
  i) at the transceiver, retrieve from the detector a sample of a signal at a particular time step and perform an edge or pulse detection based on the received data and stored data points corresponding to earlier measurements received from the detector in order to determine a received symbol;
  ii) at the transceiver, determine the required state of the emitter of the relay node in dependence upon the determined received symbol and upon whether the node is acting as a send node;
  iii) provide from the transceiver to the emitter a signal for setting the stateof the emitter;
  iv) at the transceiver, determining whether the end of a frame has been reached and, if it is determined that the end of a frame has been reached, setting the transceiver to not initiate transmissions for a predetermined period.

15. A method of relaying a signal in a wireless mesh network of nodes, the method comprising:
  receiving, at a first node comprised in the network, a first signal, the first signal corresponding to a first symbol comprised in a data frame, the first symbol having a first symbol duration s;
  generating and transmitting, at the first node, a second signal, the second signal corresponding to the first signal;
  wherein the first signal and the second signal are modulated such that a sum of the first signal and the second signal is capable of being received and demodulated by at least one relay node so as to obtain a sum of symbols including the first symbol and the second symbol; wherein a time offset r between the start titne of the transmission of the second signal by the relay node and the time at which the first signal was received by the relay node is smaller than the first symbol duration s; and
  wherein the time offset r is chosen such that any pair of corresponding signals has a time offset q which is less than s from the perspective of any relay node in the network.

* * * * *